Aug. 5, 1958  L. P. SACK  2,845,856
BARBECUE SPIT SUPPORTING MEANS
Filed June 6, 1957
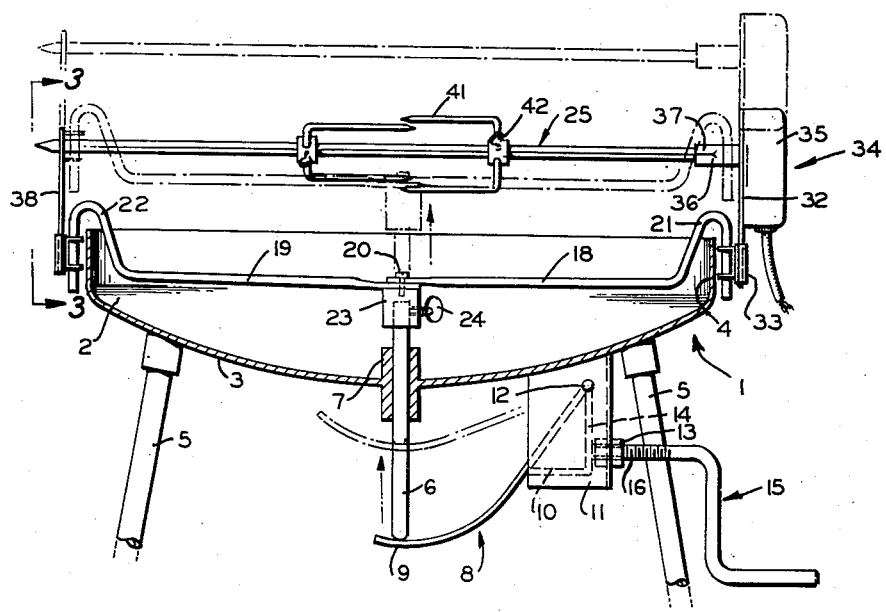
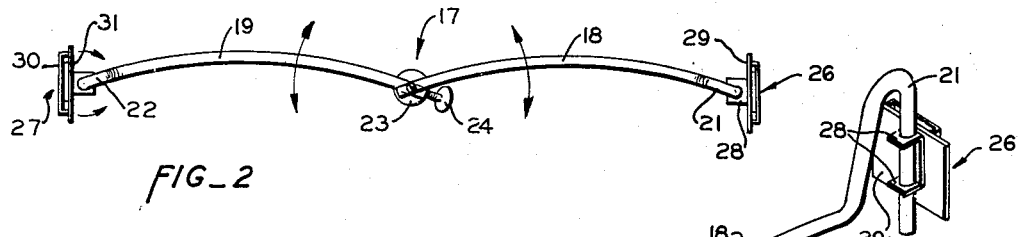
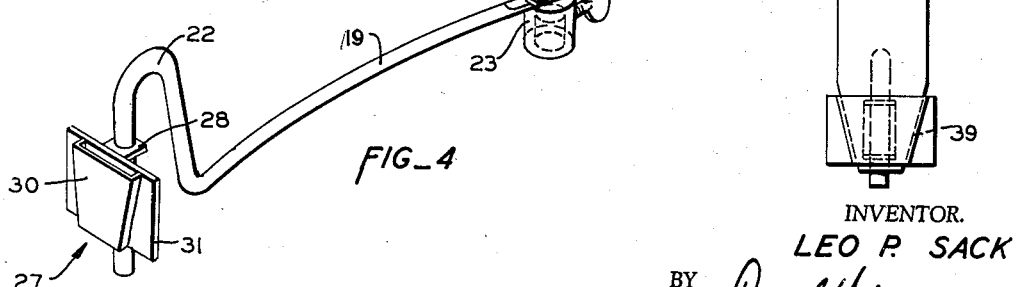
INVENTOR.
LEO P. SACK
BY
ATTORNEY

United States Patent Office

2,845,856
Patented Aug. 5, 1958

2,845,856

BARBECUE SPIT SUPPORTING MEANS

Leo P. Sack, San Francisco, Calif.

Application June 6, 1957, Serial No. 664,086

4 Claims. (Cl. 99—421)

This invention relates to a barbecue spit device.

Barbecue braziers are used extensively throughout the United States. The two primary methods of cooking with barbecue braziers are broiling and rotary roasting. A paramount problem in barbecue brazier cooking is temperature control. Barbecue braziers usually employ a charcoal fire as the source of heat to be applied to the food to be cooked. It is very difficult to control the temperature to be applied to the food being cooked by manipulating the fire. Temperature control is usually achieved by positioning the food in relation to the fire. A common type of barbecue brazier now in general use has a vertically movable center activating rod upon which is positioned a grill. The activating rod, and thus the grill, are raised and lowered by means of a crank. Temperature control with respect to broiling on a barbecue brazier is achieved by the raising and lowering of the grill. This is done in such a manner that the cook does not touch any part of the highly heated parts of the brazier.

Temperature control as well as providing for the uniform application of heat are the two major problems of barbecue brazier rotary cooking. The application of the small electric motor to driving a cooking spit helped solve the problem of uniform application of heat but further complicated the temperature control problem. In the existing art motor driven spits are fixedly positioned in relation to the fire thereby preventing proper temperature control.

One of the objects of my invention is to provide a simple and inexpensive device which may be adapted to a barbecue brazier having a center activating rod whereby temperature control is provided for rotary cooking with said brazier.

Another object of my invention is to provide a simple and inexpensive device whereby a motor driven spit may be adapted for use with a barbecue brazier having a center activating rod so that said spit may be raised and lowered in relation to the fire without the cook touching any heated member.

A further object of my invention is to provide a simple and inexpensive device which, rather than rendering obsolete many barbecue braziers now in use, permits a new adaptation to be made of portions of those braziers so that they may be used for temperature controlled rotatable cooking.

The foregoing and other objects, features and advantages of my invention will be more fully understood from the following description in connection with the accompanying illustrative drawings.

In the drawings:

Figure 1 is a diametral sectional view of a selected embodiment of my invention illustrating its use in a preferred environment;

Figure 2 is a top view of a selected embodiment of my invention;

Figure 3 is a partial elevational view looking to the right on the line 3—3 of Figure 1; and Figure 4 is a perspective view of a selected embodiment of my invention.

Figure 1 in part illustrates a typical portable barbecue brazier 1 which is well known in the art. Brazier 1 includes a cast iron bowl 2. Bowl 2 has a bottom surface 3 and side surface 4. Downwardly depending legs 5 are attached to bottom surface 3 to provide elevation for bowl 2. A vertically movable activating rod 6 is positioned in a collar 7 in the center of bottom surface 3. The lower end of activating rod 6 rests upon an adjustable support 8. The adjustable support 8 comprises a curved shoe portion 9, one end of which is designed to cooperate with activating rod 6. The other end is formed with a triangular abutment 10 and it is pivotally mounted on a depending bracket 11 by means of a pin 12. Bracket 11 in turn is attached to the bottom surface 3 of bowl 2. A threaded nut 13 is positioned on bracket 11 so as to limit the movement of adjustable support 8 and cooperate with arm 14 of triangular abutment 10. A crank 15 having a threaded arm 16 is engaged with threaded nut 13 by positioning threaded arm 16 in threaded nut 13.

The specific embodiment of my invention shown in the drawings includes a hanger 17 comprising two arc-shaped metal arms 18, 19 horizontally and pivotally joined by a rivet 20. Arms 18, 19 have at their outer ends hook-shaped members 21, 22. Hanger 17 is constructed so that arms 18, 19 each approximates in length the radius of bowl 2 and hook-shaped members 21, 22 fit over the side 4 of the bowl. Means are provided to secure hanger 17 to activating rod 6. These means comprise a hollow pipe fitting 23 positioned at the center of hanger 17 and a wing screw 24 mounted in fitting 23.

Means are provided to mount and position a motor driven rotatable spit 25 upon hanger 17. Said means include horizontally pivotal sockets 26, 27 which are attached respectively to members 21, 22 by means of horizontally disposed perforated supports 28. Sockets 26, 27 comprise rectangular, flat surface rear plates 29 and channel-shaped brackets 30 generally U-shaped in cross-section and terminating in flanges 31 which are welded to rear plates 29. The configuration of brackets 30 and rear plates 29 causes the interior of sockets 26, 27 to be shaped in the form of inverted trapezoids. Socket 26 is used as a support for a leg 32 which has a lower end 33 configured to mate with socket 26. A motor 34 is clamped to leg 32 by means of clamp 35. An output shaft 36 is connected to motor 34 so that it is parallel to the plane formed by the top of side 4 of bowl 2. A slot 37 is provided in the outer end of output shaft 36 to receive the blunt end of rotatable spit 25. Socket 27 is used as a support for a leg 38 which has a lower end 39 configured to mate with socket 27. A groove 40 is positioned in the top of leg 38 to receive the pointed end of spit 25. Groove 40 is positioned so that it is in alignment with output shaft 36.

Skewers 41 are provided to secure food to spit 25. Winged screws 42 are provided in skewers 41 so that the skewers may be fixedly positioned on spit 25.

The operation of my invention will be described with reference to the drawings. Hanger 17 is attached to activating rod 6 by means of pipe fitting 23 which is secured in place by tightening wing screw 24. Hanger arms 18, 19 are positioned so that spit 25 will overhang bowl 2 near the axis of the bowl when the blunt end of spit 25 is engaged with slot 37 and the pointed end of spit 25 rests in groove 40. Leg 32 with motor 34 clamped thereto is placed in socket 26 and leg 38 is placed in socket 27. A charcoal fire is kindled in bowl 2. When the fire reaches the proper cooking temperature for the food to be barbecued, said food is placed upon spit 25 and fixedly positioned thereon by means of skewers 41 which are held in place by wing screws 42. Spit 25, with the food thereon, is positioned on the device by placing the blunt end thereof in the slot 37 in output shaft 36 and the pointed end in groove 40 in leg 38. Motor 34 is connected to a source of power and turned on. The temperature of the food, which is rotating on spit 25, may be controlled by moving it closer to or further from the fire by turning crank 15. When crank 15 is turned in a clockwise direction, threaded arm 16 exerts pressure on abutment arm 14 causing adjustable support 8 to pivot on pin 12. This in turn causes activating rod 6, which rests upon curved shoe 9 of adjustable support 8, to rise moving the food on rotating spit 25 further away from the fire, thereby reducing the cooking temperature. Conversely, when crank 15 is moved in a counterclockwise direction the pressure exerted by threaded arm 16 on abutment arm 14 is correspondingly released causing adjustable support 8 to pivot in the opposite direction on pin 12 so that activating rod 6 is lowered; thereby moving the food on rotating spit 25 closer to the fire and increasing the cooking temperature.

The foregoing detailed description has been given for clearness of understanding only, and no unnecessary limitations should be understood therefrom, for modifications will be obvious to those skilled in the art.

I claim:

1. A bracket comprising a collar, a fastener associated with said collar, a horizontally pivotal elongated hanger secured to said collar, a pair of inverted U-shaped bends at either end of said hanger, and a pair of horizontally pivotal sockets attached to the outer ends of said inverted U-shaped bends.

2. In combination with a bowl type barbecue brazier having a motor driven rotatable spit and a central vertically adjustable activating rod, a bracket comprising a collar embracing the upper end of said rod, a fastener associated with said collar and securing said collar to the upper end of said rod, a horizontally pivotal bifurcated hanger secured to said collar, a pair of inverted U-shaped bends at either end of said hanger, and a pair of horizontally pivotal sockets attached to the outer ends of said inverted U-shaped bends.

3. A device for supporting a motor driven spit upon the vertically movable center activating rod of a barbecue brazier having means to secure said device to said center activating rod, said means comprising two arc-shaped horizontally pivotal metal arms joined by a rivet, a hollow pipe fitting and wing screw; means to mount said motor driven spit on said device, said means comprising a horizontally pivotal first socket the interior of which is shaped in the form of an inverted trapezoid, a leg, the bottom of which is configured to mate with said first socket, a motor clamped to said leg and having an output shaft with a slot in its outward end, a spit having a blunt end which is mounted in said slot and a pointed end, and means to support the pointed end of said spit comprising a horizontally pivotal second socket the interior of which is shaped in the form of an inverted trapezoid, a leg configured at its bottom to mate with said second socket, and a groove at the other end of said leg, in alignment with said output shaft, to receive the pointed end of the spit.

4. A device to provide for the raising and lowering of a motor driven spit in a barbecue brazier having a vertically movable center activating rod; said device comprising two arc-shaped horizontally pivotal metal arms joined by a rivet, each of said arms having a hook-shaped member at its outer end, a hollow pipe fitting and wing screw to secure said riveted metal arms to said center activating rod, two horizontally pivotal sockets, the interiors of which are shaped in the form of inverted trapezoids, mounted by means of said hook-shaped members, a first leg configured at its bottom to mate with said sockets positioned in the first of said sockets, a motor clamped to said first leg and having an output shaft, a slot in the outward end of said shaft, a spit having a blunt end and a pointed end, the blunt end being positioned in said slot, a second leg configured at its bottom to mate with said second of said sockets and having a groove in its top for receiving the pointed end of the spit.

References Cited in the file of this patent

UNITED STATES PATENTS

| | | |
|---|---|---|
| 2,723,658 | Schmieding | Nov. 15, 1955 |
| 2,811,099 | McGoldrick | Oct. 29, 1957 |